United States Patent [19]

Jaskowski

[11] Patent Number: 4,481,355

[45] Date of Patent: Nov. 6, 1984

[54] METHOD FOR DEGUMMING DECORTICATED PLANT BAST FIBER

[75] Inventor: Michael C. Jaskowski, Pittsburgh, Pa.

[73] Assignee: Helmic, Inc., Pittsburgh, Pa.

[21] Appl. No.: 554,256

[22] Filed: Nov. 22, 1983

[51] Int. Cl.³ .......................... C13L 1/00; D21C 3/00; D01C 1/04
[52] U.S. Cl. ........................................ 536/2; 435/275; 435/277; 435/278; 435/279; 435/917
[58] Field of Search .................... 536/2; 435/275, 277, 435/278, 279, 917

[56] References Cited

U.S. PATENT DOCUMENTS

| | | | |
|---|---|---|---|
| 103,275 | 5/1870 | Allen | 435/277 |
| 196,666 | 10/1877 | Hickox | 435/278 |
| 579,572 | 3/1897 | Geige | 435/277 |
| 655,599 | 8/1900 | Braunwalder | 169/36 |
| 1,017,176 | 2/1912 | Schreckenbach | 435/263 |
| 1,133,590 | 3/1915 | Toles | 435/822 |
| 1,746,316 | 2/1930 | Marcus | 435/822 |
| 1,795,528 | 3/1931 | Watson et al. | 435/277 |
| 1,821,673 | 9/1931 | Shamp | 435/277 |
| 1,842,024 | 1/1932 | Hollander et al. | 435/279 |
| 1,941,793 | 1/1934 | Faut | 435/279 |
| 2,020,572 | 11/1935 | Platt | 536/2 |
| 2,280,307 | 4/1942 | Diehm | 435/278 |
| 2,407,227 | 9/1946 | Earle | 435/279 |
| 2,586,407 | 2/1952 | Walsh et al. | 536/2 |
| 2,647,890 | 8/1953 | Bishop | 536/2 |
| 2,725,289 | 11/1955 | Lourd | 435/279 |
| 2,871,163 | 1/1959 | Turnbull | 435/279 |
| 3,812,013 | 5/1974 | Bellamy et al. | 435/917 |

FOREIGN PATENT DOCUMENTS 469132  7/1937  United Kingdom ................ 435/279

OTHER PUBLICATIONS

Tappi, vol. 48, No. 3, Mar. 1965, article entitled "A Method of Degumming and Bleaching Ramie Fibers and Their Physical Properties", by Venkateswaran, at pp. 191–192.
"Cultivation of Ramie in West Bengal, India", Nandi et al., *Soil and Crop Science Society of Florida, Proceedings*, vol. 24, pp. 418–425, (1964).
"Progress Report on the Chemical Degumming of Ramie by an In-Line, Open-Cook Process", Allison et al., *Soil and Crop Science Society of Florida, Proceedings*, vol. 22, pp. 176–185, (1962).
"A Further Look at the Use of Mechanical Harvesting for the Long-Fiber Crop, Ramie, and the In-Line Reception and Processing of the Fiber and Other Products", Allison et al., *Soil and Crop Science Society of Florida, Proceedings*, vol. 32, pp. 66–73 (Dec. 5, 6 and 7, 1972).
"Ramie Production in the Philippines", Garcia, *Soil and Crop Science Society of Florida, Proceedings*, vol. 24, pp. 413–417, (1964).
"Bast Fiber Production Under Florida Conditions", *Soil and Crop Science Society of Florida, Proceedings*, vol. 24, pp. 377–383, (1964).
"A Three-Way Look at the Mechanical Harvesting of Two Long Fiber Crops, Ramie and Kenaf", Allison et al., *Soil and Crop Science Society of Florida, Proceedings*, vol. 30, pp. 100–112, (1970).
"Pp. 410–412", *Soil and Crop Science Society of Florida, Proceedings*, vol. 24, (1964).
ICN Nutritional Biochemicals, Catalog, forward and reverse cover pp., certain introductory pp., and pp. 90–91, date unknown.

*Primary Examiner*—Ronald W. Griffin
*Attorney, Agent, or Firm*—Stanley J. Price, Jr.; John M. Adams

[57] ABSTRACT

A method for degumming decorticated plant bast fiber such as ramie bast fiber, to remove pectin-containing material therefrom. The decorticated plant bast fiber is washed with a washing solution containing a surface active agent to penetrate the plant bast fiber to remove water soluble material therefrom. The washed plant bast fiber is then rinsed. The washed and rinsed plant bast fiber is treated with an aqueous, acidic treatment solution of fungal pectinase for a period of time up to about one hour to degum the plant fiber. The treatment solution is maintained at an elevated temperature and has a pH between about 2.0 and about 4.5.

26 Claims, 1 Drawing Figure

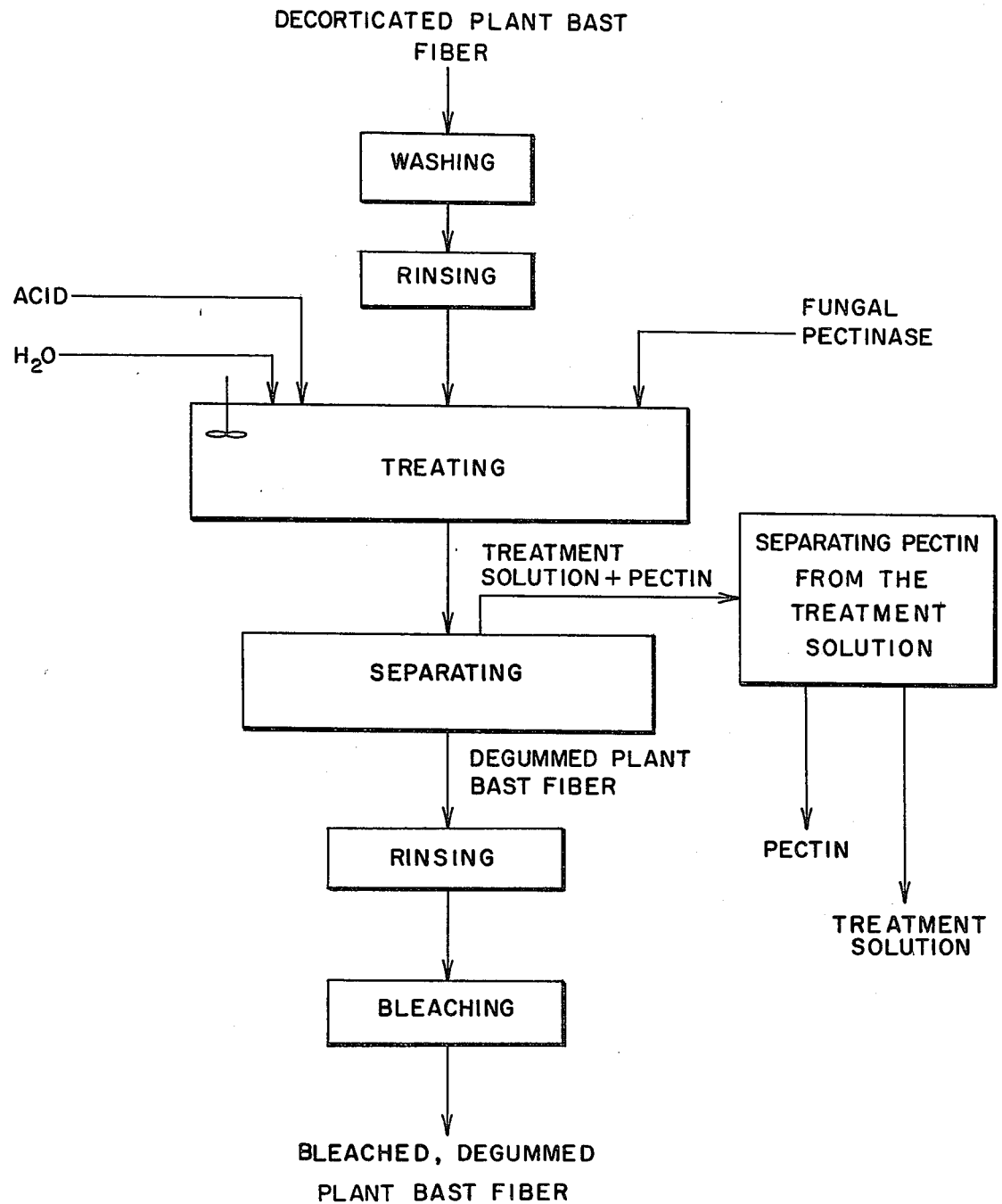

METHOD FOR DEGUMMING DECORTICATED PLANT BAST FIBER

BACKGROUND OF THE INVENTION

1. Field of the Invention

This invention relates to a method for degumming decorticated plant bast fiber to remove pectin-containing material therefrom and, more particularly, to a method for degumming decorticated ramie bast fiber.

2. Description of the Prior Art

Most of the major plant fibers of the world can be characterized either as stem, or bast, fibers or can be characterized as leaf fibers. This invention is primarily concerned with degumming decorticated bast fibers, such as ramie or hemp, to remove the pectin-containing material that surrounds the individual bast fibers.

A bark-like covering surrounds the bast fibers and the pectin-containing material around each fiber to form an outer sheath. The breaking down and/or removing of a substantial portion of this outer sheath is generally referred to as decortication. Decortication can be accomplished manually or by known conventional mechanical decorticating apparatus.

A substantial proportion of the pectin-containing material which surrounds the individual bast fibers is pectin, with the remaining portion being primarily various water soluble constituents. Pectin is a polymer similar in chemical structure and behavior to cellulose. Pectin is generally insoluble in water or acid, but may be broken down in an alkaline solution, such as an aqueous solution of sodium hydroxide.

Removal of the pectin-containing material, or gum, is necessary, in many instances, for utilization of the fiber for its intended purposes. Various methods are known which encompass degumming, or removing, the pectin-containing substances from the individual bast fiber. For example, U.S. Pat. No. 2,407,227 to Earle discloses a retting method for the treatment of fibrous vegetable or plant material, such as flax, ramie, and hemp.

Retting is defined in the Earle patent as the facilitation of the separation of the individual fibers from the surrounding plant matter and from each other, through the breaking down, or removal from the plant structure, by means of fermentation, of the waxy, resinous, or gummy binding substances present in the plant.

Earle discloses a method for the retting of flax and analogous fibers in plant material, as mentioned above, which is carried out in an enzymically-active solution having a mildly acidic pH. Earle's method consists of positively acidifying water to a degree approaching and slightly less than the optimum acid concentration for enzymatic activity. To this solution there is added an amount of enzymically-active solution from a previous ret so as to bring the concentration of acid of the resulting mixture to the optimum value. The mixture is then heated to a temperature which will maximize enzymatic action. The flax or other analogous fibrous plant material is then steeped into the mixture which is maintained at a sustained elevated temperature. The fibrous plant material is removed from the mixture when the acid concentration of the solution in which the fibrous plant material is steeped begins to decline.

Earle mentions that if decorticated fiber is to be retted, the water can be more highly acidified, even to a pH of 4.0, then heated preferably to a temperature of 90° F. to 95° F. and then mixed with a suitable amount of heated solution from a previous ret. If solution from a previous ret is not available, the solution may be developed through the retting of detached shives, for example. In Earle, it is mentioned that retting of decorticated material requires a total time of not more than 24 to 36 hours.

U.S. Pat. No. 2,871,163 to Turnbull discloses a method for the separation of fiber from fiber-containing plants such as jute, kenaf, ramie, flax, sisal, abaca, and hemp. In Turnbull, a cytase-containing liquor is extracted from plants of the same kind as those for which fiber separation is to be accomplished. The fiber-containing plant portions are crushed, and the crushed portions are treated for a period of one to four days at a temperature between 30° C. and 60° C. with the cytase-containing liquor to decompose the pectin or pectinaceous compounds of the plants to free the fibers therefrom. Examples of cytases given in Turnbull are pectases, pectinase, and protopectinase. Turnbull mentions that the cytases may also be found in certain fruits, vegetables, various fungi and bacteria; and cytases obtained from these sources may be used in Turnbull's method. Turnbull states that it is advantageous to maintain the pH of the extracted cytase-containing liquor at between 6 and 8, and preferably below 7.

U.S. Pat. No. 2,725,289 to Lourd discloses a process for the chemical retting of ramie, flax, hemp, jute, and the like. In the process of the Lourd patent, the fibrous material is subjected to a first treatment by an aqueous solution having an alkali base containing a palmitate of an amine base which functions as an emulsifier; and then to a second treatment with an aqueous solution which includes the same substances as that in the first treatment and additionally contains an oxidizing agent.

U.S. Pat. No. 1,941,793 to Faut discloses a retting process of textile materials. In Faut, a special compound is added to the retting water. The special compound is composed of saponified fatty stuffs to which are added, in certain proportions, salts from strong bases and weak acid. These saponified fatty substances divide and dissolve in the retting water providing a coating to protect the fibers from the action of the free nascent alkali liberated in the incompletely saturated medium.

U.S. Pat. No. 1,842,024 to Hollander et al. discloses a process for retting fibers in which a cellulose fiber is surrounded by a cortex of ligneous material, such as flax, ramie, jute, sisal, hemp, etc. In Hollander's method, an enzyme capable of digesting a cortex of ligneous material surrounding a cellulose fiber is added to the retting bath. Hollander mentions that suitable enzymes include enzymes prepared from fungi, such as species of Aspergillus. The Hollander patent mentions that best results are obtained in a bath having a pH value of from 5 to 8 with an optimum pH value being about 7. The patent further mentions that the pH value of the enzyme bath is regulated by the addition of acids, such as acetic acid and sulfuric acid. This patent mentions that the duration of the enzyme step can vary, but generally will be between 24 and 48 hours.

In the process of the Hollander et al. patent, the fibers are first subjected to an alkaline bath and are then subjected to the enzyme bath. The chemical alkaline bath serves to open the cortex of ligneous material to make the cortex more accessible to the action of the enzyme bath. Hollander et al. states that a buffer is preferably added to the chemical alkaline bath to protect the cellulose fibers from the action of the alkaline liquid.

U.S. Pat. No. 1,795,528 to Watson et al. discloses a process of producing fiber and yarn from flax. In the process, the fibers are eventually twisted into a rove. The rove is wound onto an open reel and retted bacteriologically to soften the gummy matter associated with the fibers.

U.S. Pat. No. 1,746,316 to Marcus discloses a process for retting textile fibers, such as flax, jute, and ramie. In the method of the Marcus patent, a nitrogen fixing bacteria is added to the retting process to degum the gum or pectin from the fiber.

U.S. Pat. No. 1,133,590 to Toles discloses a method and apparatus for retting fibrous materials. In this patent, a specific ferment is added to the retting fluid and acts as a natural solvent of the gummy substances and hastens the removal of the gummy substances from the fiber. This ferment is a specific pectin ferment which hastens the propagation of the retting bacteria.

U.S. Pat. No. 103,275 to Allen discloses a process for loosening or separating long-line fiber, such as ramie fiber, from its hard woody stalk by means of a fermenting bath.

U.S. Pat. No. 1,017,176 to Schreckenbach discloses a method of treating raw and worked textile fibers, such as jute, hemp, and ramie. In this patent, glycerin is added to a fermenting bath to promote the growth of an effective organized ferment. The organized ferment has the effect of dissolving the gummy material in the fibers and loosening the bundles of cells. The core of the cell, however, is left intact.

In an article entitled "A Method of Degumming and Bleaching Ramie Fibers and Their Physical Properties" by Venkateswaran appearing in "Tappi", Volume 48, no. 3, (March, 1965), two procedures for degumming ramie fibers are disclosed. The first procedure includes an ethyl alcohol extraction of the fiber for a 2 to 4 hour period and a treatment of the fiber for a period of two hours with a boiling sodium hydroxide solution. In the second procedure, the ramie fibers were soaked in ethanol overnight; and the ethanol-treated fibers were washed with deionized water.

In an article entitled "Cultivation of Ramie in West Bengal, India" by Nandi et al., Soil and Crop Science Society of Florida, Proceedings, Volume 24, pp. 418–425, (1964), it is disclosed that degumming of ramie fiber is accomplished by alkali treatments by boiling in large open pans and can also be carried on by microbiological retting.

In the article "Progress Report on the Chemical Degumming of Ramie by an In-line, Open-cook Process" by Allison et al., Soil and Crop Science Society of Florida, Proceedings, Volume 22, pp. 176–185 (1962), an in-line degumming apparatus for degumming ramie fiber by moving the fiber through the apparatus through a degumming solution is disclosed. The contents of the degumming solution are apparently not disclosed in this article; and the article mentions that such in-line apparatus can accomplish the degumming in from about 7 to 10 minutes. However, this article notes that the denier, or the weight, in grams, of a fiber 9,000 meters in length, is consistently higher when compared with conventionally known pressure degumming systems by a factor as much as 1.5 to 2.0 units or more. The article indicates that the higher denier suggests something is remaining in the fiber degummed by such in-line apparatus. The article concludes that the actual usefulness of ramie fiber coming from the in-line method of degumming was still, at the time of the writing of the article, to be proven at the industrial level.

As can be seen from the foregoing, conventionally known processes for degumming plant bast fiber, such as ramie and hemp, require a considerable amount of time, may degrade the fiber, or may leave various impurities with the fiber which may not be desirable in certain applications or uses for the fiber.

What is needed, therefore, is a method for degumming plant bast fiber, such as ramie or hemp bast fiber, which can accomplish degumming of the fiber in a substantially short period of time, and provide a high quality product that is at least equal to or superior to that obtainable by conventional degumming methods.

SUMMARY OF THE INVENTION

In accordance with the present invention, there is provided a method for degumming decorticated plant bast fiber, such as ramie or hemp bast fiber, to remove pectin-containing material therefrom. In the method, the decorticated plant bast fiber is washed with a washing solution containing a surface active agent to penetrate the plant bast fiber to remove water soluble material therefrom. The washed plant bast fiber is then rinsed. The washed and rinsed plant bast fiber is then treated with an aqueous, acidic treatment solution of fungal pectinase for a period of time up to about one hour to degum the plant bast fiber. The treatment solution is maintained at an elevated temperature and has a pH of between about 2.0 and about 4.5.

Desirably, the degummed plant bast fiber is separated from the aqueous, acidic treatment solution of fungal pectinase and is rinsed. Additionally, the rinsed, degummed plant bast fiber may be bleached.

The present invention further provides a method for separating from the aqueous, acidic fungal pectinase treatment solution the pectin removed from the plant bast fiber.

Accordingly, an object of the present invention is to provide an efficient and rapid method for degumming plant bast fiber, such as ramie or hemp bast fiber.

A further object of the present invention is to provide a method for degumming plant bast fiber which can produce degummed plant bast fiber of acceptable quality while substantially minimizing degradation of the fiber.

These and other objects of the present invention will be more completely disclosed and described in the following specification, the accompanying drawing, and the appended claims.

BRIEF DESCRIPTION OF THE DRAWING

The sole FIGURE is a flow diagram illustrating the method of the present invention. The flow diagram also includes other desirable steps which may be used in conjunction with the method of the present invention.

DESCRIPTION OF THE PREFERRED EMBODIMENTS

Referring to the flow diagram, the method of the present invention for degumming decorticated plant bast fiber, such as ramie or hemp bast fiber, is illustrated. The decorticated plant fiber is washed with a washing solution, preferably aqueous in nature, containing a surface active agent to penetrate the plant bast fiber to remove water soluble material including any debris from the pectin-containing material surrounding the plant bast fiber.

The decorticated plant bast fiber can be washed in a conventional washing apparatus. A conventional washing apparatus for use in the present invention desirably includes a container or tub for holding liquid, at least one agitator in the container or tub for agitating the plant bast fiber in the liquid, and intake and discharge conduits connected to or in communication with the container or tub for adding liquid thereto or removing liquid therefrom. At least one pump is desirably provided for assisting with the inflow and outflow of liquid to or from the container or tub, respectively. A motor or other drive means is preferably provided for drivingly engaging the agitator or agitators. The conventional washing apparatus desirably performs washing and rinsing functions. An example of a suitable conventional washing apparatus is a commercial washing machine.

The washing solution is added to the washing apparatus and the decorticated plant bast fiber is placed therein. The decorticated plant bast fiber is agitated in the washing solution in the washing apparatus to promote penetration of the plant fibers to remove the water soluble material therefrom.

In this method, any of a number of commercially available surface active agents which function as a penetrant can be used, such as TRITON X-100 which includes the penetrant alkyl phenoxy polyethoxy ethanol. The surface active agent functions to penetrate the plant bast fibers to remove water soluble material from the pectin-containing material surrounding the plant bast fiber. Commercially available detergents containing a surface active agent functioning as a penetrant can be used. An example of a surface active agent found in commercial detergents is sodium alkyl aryl sulfonate. The detergent may also include, for example, sodium sulfate and sodium carbonate which serve as processing aids, sodium silicate which functions as an anti-caking and anti-corrosion agent, and carboxymethyl cellulose which serves as an anti-soil redeposition agent.

It is preferred that the surface active agent in the washing solution be either non-ionic or anionic, a non-ionic surface active agent being most preferable. Cationic surface active agents are generally not desirable, since they tend to soften the fibers.

The time required for washing the decorticated plant bast fiber with the washing solution is dependent upon the initial condition of the plant bast fiber. The washing time generally is from about 2 minutes up to about 15 minutes on the average, considering the initial condition of the decorticated plant bast fiber. Washing from about 5 to about 15 minutes is generally preferred. The water soluble material removed in the washing step accounts for up to about 5% of the pectin-containing material which surrounds the plant bast fiber. It is preferred that the washing take place in a warm, aqueous washing solution. The temperature of the warm water used in the aqueous washing solution desirably is in a temperature range normally used with most commercial washing machines. The amount of surface active agent used may vary, depending upon various factors, such as the initial condition of the decorticated plant bast fiber.

The washed plant bast fiber is then rinsed to remove any water soluble material which may still be adhering to the pectin-containing material surrounding the plant bast fiber, as well as to substantially prevent re-deposition of the removed, water soluble material onto the plant bast fiber. Rinsing is accomplished, for example, in the previously described commercial washing apparatus by agitation of the plant bast fiber in the rinsing liquid in the washing apparatus. Rinsing by other suitable means, such as by spraying a sufficient quantity of rinsing agent on the washed plant bast fiber, can also be employed. A suitable rinsing agent is used. Water is generally preferred as a rinsing agent for accomplishing the rinsing of the plant bast fiber. Either cold or warm water may be used for rinsing the washed plant bast fiber.

The number of rinses required and the time for rinsing varies, depending upon the initial condition of the decorticated plant bast fiber. Generally, a single rinse is sufficient. The rinse can be a spin-rinse performed in the previously described conventional washing apparatus, the conventional washing apparatus further including a rotatably mounted tub which is drivingly connected to a motor or other drive means and a spraying device for spraying the rinsing agent onto the plant fiber as the tub is rotated. It is preferable, however, to rinse the washed plant bast fiber twice. A visual inspection of the rinsed plant bast fiber is often helpful in determining if additional rinsing is necessary.

The washed and rinsed plant bast fiber is then treated with an aqueous, acidic treatment solution of fungal pectinase for a period of time up to about one hour to degum the plant bast fiber, thereby removing the pectin therefrom. This treatment solution is maintained at an elevated temperature during the treatment of the plant bast fiber therewith and has a pH of between about 2.0 and about 4.5.

The treatment solution initially is acidified to bring the pH between about 2.0 and about 4.5 by using any of various commercially available acids. Examples of suitable acids are hydrochloric acid, sulfuric acid, phosphoric acid, and glacial acetic acid. The amount of acid needed to achieve a pH value within the above mentioned range is dependent upon the amount of water used in the treatment solution and the concentration of the acid. It is preferable that the pH of the treatment solution be about 3.5.

The fungal pectinase added to the acidified aqueous solution desirably is an allomelanin; and, preferably, the fungal pectinase employed is an allomelanin obtained from any source of aspergillus niger. An example of a suitable source for the fungal pectinase is "Pectinase, Tech. Powder (Fungal)", available from ICN Nutritional Biochemicals. About one gram to about 25 grams of fungal pectinase is added to the treatment solution for each 10,000 grams of plant bast fiber with each 10,000 grams of plant bast fiber in a volume of about 30 gallons to about 45 gallons of treatment solution. An equivalent relationship of fungal pectinase to plant bast fiber to volume of treatment solution is used for incremental amounts of less than 10,000 grams of plant bast fiber. For 5,000 grams of plant bast fiber, for example, about 0.5 grams to about 12.5 grams of fungal pectinase is needed and a volume of treatment solution of about 15 gallons to about 22.5 gallons is used.

The aqueous, acidic fungal pectinase treatment solution is maintained at an elevated temperature for the treatment of the washed and rinsed plant bast fiber. Such elevated temperature helps to promote a faster reaction rate for degumming the plant bast fiber. Generally, at lower temperatures the degumming reaction proceeds, but at a much slower rate than at higher temperatures. The reaction temperature or temperature range generally is chosen so as to promote maximum enzymatic activity and thereby maximize the degumming rate of the plant bast fiber. A desired temperature range is from about 100° F. to about 160° F., with a range of about 120° F. to about 140° F. being preferred.

If the treatment solution is maintained at too high a temperature for the fungal pectinase enzyme, the enzyme will not function efficiently or, depending on the temperature, the enzyme is destroyed. Therefore, the elevated temperature range at which the treatment solution is maintained is largely dependent upon the fungal pectinase enzyme. Further, if the treatment solution is maintained at too high a temperature, the acid in the treatment solution increases in activity, thereby raising the potential for degradation of the plant bast fiber by acid hydrolysis. A preferred temperature range for a fungal pectinase which is an allomelanin obtained from a source of aspergillus niger is generally about 120° F. to about 140° F. Additionally, a small amount of a non-ionic penetrant, such as "TRITON X-100," is preferably added to the treatment solution to hasten the fungal pectinase enzyme's penetration into the pectin in the pectin-containing material surrounding the plant bast fiber.

The washed and rinsed plant bast fiber is treated with the aqueous, acidic treatment solution of fungal pectinase for a period of time up to about one hour. If the decorticated bast fiber remains in the treatment solution for longer than about one hour, acid hydrolysis causes significant degradation of the plant bast fiber which is primarily cellulose. The acidic nature of the treatment solution having a pH of between about 2.0 and about 4.5 promotes the acid hydrolysis.

Desirably, the plant bast fiber should be treated in the treatment solution for about 15 minutes, especially if the treatment solution has a pH value between about 2.0 and about 4.5, is maintained at a temperature of from about 120° F. to about 140° F., and includes fungal pectinase obtained from a source of aspergillus niger.

The treatment of the plant bast fiber in the aqueous, acidic treatment solution of fungal pectinase is carried out using conventional apparatus, such as a conventional washing apparatus as previously described herein. A suitable way of treating the plant bast fiber with the treatment solution is to place the plant bast fiber in the treatment solution in the conventional washing apparatus, such as a commercial washing machine, and agitate the plant bast fiber in the treatment solution for the requisite period of time.

While not considered essential for the degumming of the plant bast fiber according to the present invention, it is most preferable that the degummed plant bast fiber be separated from the aqueous, acidic treatment solution of fungal pectinase. Separation of the degummed plant bast fiber is accomplished in a number of conventionally known ways. For example, if a conventional washing apparatus, as previously described, was employed in the treatment of the plant bast fiber with the treatment solution, draining of the washing machine would generally accomplish a substantial portion of the separation. In other applications, the degummed plant bast fiber could be physically removed from the treatment solution by conventional mechanical apparatus, for example, to effect the separation. Separation of the degummed plant bast fiber from the treatment solution functions to retard degradation of the degummed plant bast fiber by acid hydrolysis and aids in preventing re-deposition of the pectin onto the plant bast fiber.

Additionally, in conjunction with the separation of the degummed plant bast fiber from the aqueous, acidic treatment solution of fungal pectinase, the degummed plant bast fiber desirably is rinsed with an appropriate rinsing agent, such as water. This rinsing prevents degradation of the degummed plant bast fiber by acid hydrolysis by rinsing from the degummed plant bast fiber any residual acidic constituents remaining in contact therewith, as well as substantially preventing re-deposition of any pectin onto the plant bast fiber.

Rinsing of the degummed plant bast fiber is accomplished preferably within about one hour after the completion of the treatment of the plant bast fiber in the aqueous, acidic treatment solution of fungal pectinase. Prompt rinsing significantly minimizes losses in fiber and in fiber strength. Most preferably, the degummed plant bast fiber is immediately rinsed after being treated with the treatment solution.

Rinsing should take place for a sufficient time to ensure that substantially none of the acidic constituents and substantially none of the removed pectin are in contact with the degummed plant bast fiber. Usually, the rinsing time using a sufficient quantity of water is at least about 2 minutes. The degummed plant bast fiber can be rinsed in a conventional washing apparatus, such as a washing machine, as previously described herein. Cold or warm rinse water may be employed for rinsing of the degummed plant bast fiber.

Unlike certain known processes for degumming plant bast fiber which use an alkali solution such as sodium hydroxide, the pectin removed from the plant bast fiber in the method of the present invention is not broken down. The pectin can be separated from the aqueous, acidic treatment solution of fungal pectinase by known separating methods, pectin being generally insoluble in water or acids. The pectin so separated can be appropriately purified, if desired, and used or sold for various applications.

Although not considered an essential step to the method of the present invention for degumming the decorticated plant bast fiber, the rinsed, degummed plant bast fiber can be bleached to whiten the fiber. The bleaching is accomplished in a conventional manner. For example, the degummed plant bast fiber can be agitated in a warm, aqueous solution of a chlorine bleach for about 30 seconds to about one minute in a conventional washing apparatus or washing machine, as previously described herein.

After the degummed plant bast fiber is subjected to the bleaching solution for the requisite period of time, the fiber which has been bleached is desirably rinsed with an appropriate amount of a suitable rinsing agent, such as water, to substantially remove any bleaching constituents remaining in contact with the plant fiber. For example, the rinsing is accomplished by rinsing the plant fiber with a suitable rinsing agent, such as water, in a conventional washing apparatus or washing machine, as previously described herein.

The following example is illustrative of the method of the present invention for degumming decorticated bast fiber.

EXAMPLE

Eighteen pounds of decorticated ramie bast fiber was washed in 45 gallons of warm tap water containing 8 to 12 ounces (227-340 grams) of a commercially available laundry detergent, the laundry detergent containing an anionic surface acitve agent. The decorticated ramie bast fiber was washed for about 15 minutes in the detergent solution in a conventional washing machine to remove the water soluble materials in the pectin-containing material surrounding the ramie bast fiber, as well as any extraneous debris present on the fiber.

The washed ramie bast fiber was then rinsed twice with tap water in a conventional washing machine to ensure that any detergent, water soluble material from the pectin-containing material surrounding the ramie bast fiber, and any associated debris were removed from the ramie bast fiber to be degummed.

The washed and rinsed ramie bast fiber was agitated in a conventional washing machine containing 45 gallons of acidified tap water, adjusted to a pH of between about 2.0 and about 4.5 by the addition of a sufficient amount of hydrochloric acid. One gram (0.04 ounces) of powdered fungal pectinase was added to the solution. Additionally, 5 drops (0.2 ml) of TRITON X-100, a non-ionic penetrant, was also added to hasten the enzyme's penetration into the pectin. The ramie bast fiber was treated in this treatment solution for about 15 minutes.

At the conclusion of the 15 minutes in the treatment solution, the ramie bast fiber was separated from the treatment solution and was immediately rinsed with tap water for about 2 minutes in a conventional washing machine. At this point, the degummed ramie bast fiber had a slight tan color. The yield of the degummed ramie bast fiber was about 15½ to about 16 pounds.

To whiten the degummed ramie bast fiber, the fiber was placed in a conventional washing machine in 45 gallons of warm tap water to which about 8 to 12 ounces (227-340 grams) of a conventional chlorine bleach was added to the tap water. The degummed ramie bast fiber was then agitated in the bleaching solution for about 30 seconds to about one minute. The ramie bast fiber was then rinsed in a sufficient amount of water in a conventional washing machine to remove any bleaching constituents remaining therewith. The resulting rinsed, bleached ramie bast fiber had a white color.

According to the provisions of the patent statutes, I have explained the principle, preferred construction and mode of operation of my invention and have illustrated and described what I now consider to represent its best embodiments. However, it should be understood that, within the scope of the appended claims, the invention may be practiced otherwise than as specifically illustrated and described.

I claim:

1. A method for degumming decorticated plant bast fiber to remove pectin-containing material therefrom comprising the steps of,
   washing the decorticated plant bast fiber with a washing solution containing a surface active agent to penetrate said plant bast fiber to remove water soluble material therefrom,
   rinsing the washed plant bast fiber, and
   treating the washed and rinsed plant bast fiber with an aqueous, acidic treatment solution of fungal pectinase for a period of time up to about one hour to degum the plant bast fiber, said solution being maintained at an elevated temperature and having a pH between about 2.0 and about 4.5.

2. The method as set forth in claim 1 further comprising,
   separating said degummed plant bast fiber from said aqueous, acidic treatment solution of fungal pectinase.

3. The method as set forth in claim 2 further comprising,
   rinsing said degummed plant bast fiber.

4. The method as set forth in claim 3 further comprising,
   bleaching said degummed plant bast fiber.

5. The method as set forth in claim 1 wherein,
   said plant bast fiber is treated in said aqueous, acidic treatment solution of fungal pectinase for about 15 minutes.

6. The method as set forth in claim 1 wherein,
   said aqueous, acidic treatment solution of fungal pectinase has about one gram to about 25 grams of fungal pectinase for each 10,000 grams of plant bast fiber to be treated with each 10,000 grams of plant bast fiber in a volume of about 30 gallons to about 45 gallons of said treatment solution.

7. The method as set forth in claim 1 wherein,
   the pH of said aqueous, acidic treatment solution of fungal pectinase is about 3.5.

8. The method as set forth in claim 1 wherein,
   said aqueous, acidic treatment solution of fungal pectinase is maintained at a temperature between about 100° F. and about 160° F.

9. The method as set forth in claim 8 wherein,
   said aqueous, acidic treatment solution of fungal pectinase is maintained at a temperature between about 120° F. and about 140° F.

10. The method as set forth in claim 1 wherein,
    said fungal pectinase in said treatment solution is an allomelanin obtained from any source of aspergillus niger.

11. The method as set forth in claim 1 wherein,
    said surface active agent in said washing solution is a non-ionic penetrant.

12. The method as set forth in claim 1 wherein,
    said aqueous, acidic treatment solution of fungal pectinase includes a non-ionic penetrant.

13. The method as set forth in claim 1 further comprising,
    separating said aqueous, acidic treatment solution of fungal pectinase from said degummed plant bast fiber, said solution containing pectin removed from said plant bast fiber, and
    separating the pectin from said treatment solution.

14. A method for degumming decorticated ramie bast fiber to remove pectin-containing material therefrom comprising the steps of,
    washing the decorticated ramie bast fiber with a washing solution containing a surface active agent to penetrate said ramie bast fiber to remove water soluble material therefrom,
    rinsing the washed ramie bast fiber, and
    treating the washed and rinsed ramie bast fiber with an aqueous, acidic treatment solution of fungal pectinase for a period of time up to about one hour to degum the ramie bast fiber, said solution being maintained at an elevated temperature and having a pH between about 2.0 and about 4.5.

15. The method as set forth in claim 14 further comprising,
    separating said degummed ramie bast fiber from said aqueous, acidic treatment solution of fungal pectinase, said treatment solution containing pectin removed from said ramie bast fiber, and
    rinsing said degummed ramie bast fiber.

16. The method as set forth in claim 15 further comprising, bleaching said degummed ramie bast fiber.

17. The method as set forth in claim 15 further comprising,
separating said pectin from said aqueous, acidic treatment solution of fungal pectinase.

18. The method as set forth in claim 14 wherein,
said aqueous, acidic treatment solution of fungal pectinase is maintained at a temperature between about 100° F. and about 160° F.

19. The method as set forth in claim 18 wherein,
said aqueous, acidic treatment solution of fungal pectinase is maintained at a temperature between about 120° F. and about 140° F.

20. The method as set forth in claim 19 wherein,
said ramie bast fiber is treated is said aqueous, acidic treatment solution of fungal pectinase for about 15 minutes.

21. The method as set forth in claim 14 wherein,
said aqueous, acidic treatment solution of fungal pectinase has about one gram to about 25 grams of fungal pectinase for each 10,000 grams of ramie bast fiber to be treated with each 10,000 grams of ramie bast fiber in a volume of about 30 gallons to about 45 gallons of said treatment solution.

22. A method for degumming decorticated ramie bast fiber to remove pectin-containing material therefrom comprising the steps of,
washing the decorticated ramie bast fiber with an aqueous washing solution containing a surface active agent to penetrate said ramie bast fiber to remove water soluble material therefrom,
rinsing the washed ramie bast fiber with water, and
treating the washed and rinsed ramie bast fiber with an aqueous, acidic treatment solution of fungal pectinase for a period of time up to about one hour to degum the ramie bast fiber, said treatment solution being maintained at a temperature between about 100° F. and about 160° F. and having a pH of between about 2.0 and about 4.5 and having about one gram to about 25 grams of fungal pectinase for each 10,000 grams of ramie bast fiber to be treated with each 10,000 grams of ramie bast fiber in a volume of about 30 gallons to about 45 gallons of said treatment solution.

23. The method as set forth in claim 22 wherein,
said treatment solution is maintained at a temperature between about 120° F. and about 140° F.

24. The method as set forth in claim 22 wherein,
said aqueous, acidic treatment solution of fungal pectinase includes an acid selected from the group consisting of hydrochloric acid, sulfuric acid, phosphoric acid, acetic acid and mixtures thereof to adjust the pH of said treatment solution,
said treatment solution includes a non-ionic penetrant, and
said fungal pectinase in said treatment solution is an allomelanin obtained from a source of aspergillus niger.

25. The method as set forth in claim 22 further comprising,
separating said aqueous, acidic treatment solution of fungal pectinase from said degummed plant bast fiber, and
rinsing said degummed plant bast fiber with water.

26. The method as set forth in claim 25 further comprising,
bleaching said degummed ramie bast fiber.

* * * * *